US008698653B2

(12) United States Patent
Rogers et al.

(10) Patent No.: US 8,698,653 B2
(45) Date of Patent: Apr. 15, 2014

(54) DISPLAY SYSTEM AND METHOD FOR GENERATING A DISPLAY

(75) Inventors: William Rogers, Minneapolis, MN (US); Michael Christian Dorneich, Saint Paul, MN (US); Chris Hamblin, League City, TX (US); Stephen Whitlow, St. Louis Park, MN (US)

(73) Assignee: Honeywell International Inc., Morristown, NJ (US)

( * ) Notice: Subject to any disclaimer, the term of this patent is extended or adjusted under 35 U.S.C. 154(b) by 94 days.

(21) Appl. No.: 13/483,645

(22) Filed: May 30, 2012

(65) Prior Publication Data

US 2013/0214941 A1 Aug. 22, 2013

Related U.S. Application Data

(60) Provisional application No. 61/600,446, filed on Feb. 17, 2012.

(51) Int. Cl.
*B64D 45/00* (2006.01)

(52) U.S. Cl.
USPC .................. 340/945; 701/9; 701/14; 340/971

(58) Field of Classification Search
USPC ................................ 340/945, 971; 701/9, 14
See application file for complete search history.

(56) References Cited

U.S. PATENT DOCUMENTS 5,940,013 A 8/1999 Vladimir et al.
6,038,498 A 3/2000 Briffe et al.
6,778,906 B1 8/2004 Hennings et al.
7,148,814 B2 * 12/2006 Sikora et al. .................. 340/945
7,787,999 B1 8/2010 Barber
8,055,375 B2 11/2011 Pingel et al.
2004/0158370 A1 8/2004 Le Draoullec et al.
2007/0208725 A1 9/2007 Gilger et al.
2010/0066565 A1 * 3/2010 Francois et al. .............. 340/963

OTHER PUBLICATIONS

Waldron, S.M. et al.; Adaptive Information Fusion for Situation Awareness in the Cockpit; Proceedings of the Human Factors and Ergonomics Society 49th Annual Meeting—2005.

Johnson, N. et al.; Effects of Advanced Cockpit Displays on General Aviation Pilots' Decisions to Continue Visual Flight Rules Flight Into Instrument Meteorological Conditions; Proceedings of the Human Factors and Ergonomics Society 50th Annual Meeting—2006.

(Continued)

*Primary Examiner* — Brent Swarthout
(74) *Attorney, Agent, or Firm* — Ingrassia Fisher & Lorenz, P.C.

(57) ABSTRACT

A display system and method for providing a display. A display system includes a computer processor, the computer processor being configured to receive information from a plurality of sensors. The computer processor is further configured to detect an abnormal situation, based on information received from the plurality of sensors. The display system further includes a database including abnormal situation response procedures in operable communication with the processor, wherein the database is configured to provide the processor with the abnormal situation response procedures upon the detection of an abnormal situation. The display system further includes a display device in operable communication with the processor, wherein the display device is configured to display information from the sensors regarding the abnormal situation and the abnormal situation response procedures.

10 Claims, 4 Drawing Sheets

(56) References Cited

OTHER PUBLICATIONS

Miller, C.A. et al.; The Rotorcraft Pilot's Associate Cockpit Information Manager: Acceptable Behavior from a New Crew Member?; Presented at the American Helicoptor Society 55th Annual Forum, Montreal, Quebec, May 25-27, 1999.

Gulfstream G350, G450, G500 and G550, Honeywell, Featuring Honeywell's Primus EPIC Integrated Avionics System, Gulfstream PlaneView Advanced Cockpit, Sep. 2004.

EP Search Report for Application No. 13 153 394.3 dated May 31, 2013.

EP Communication for Application No. 13 153 394.3 dated Jun. 12, 2013.

* cited by examiner

DISPLAY SYSTEM AND METHOD FOR GENERATING A DISPLAY

CROSS-REFERENCE TO RELATED APPLICATIONS

The present application claims the benefit of priority to U.S. provisional patent application Ser. No. 61/600,446, titled "DISPLAY SYSTEM AND METHOD FOR GENERATING A DISPLAY," filed Feb. 17, 2012. The contents of said application are herein incorporated by reference in their entirety.

TECHNICAL FIELD

The present disclosure relates generally to electronic displays. More particularly, the present disclosure relates to flight display systems and methods for generating flight displays.

BACKGROUND

Current aircraft display systems include multiple cockpit displays. A common type of aircraft display is a multi-function display (MFD), which can be variously configured to display information to the flight crew including navigation information, flight plan information, avionics, and other information relevant to the aircraft. Another common type of aircraft display is an electronic flight bag (EFB), which is a general purpose computing platform intended to reduce, or replace, paper-based reference material often found in the pilot's carry-on flight bag, including the aircraft operating manual, flight crew operating manual, and navigational charts, for example. Yet another common type of aircraft display is the primary flight display (PFD). The PFD is a graphical display that is generated on a display screen and that visually expresses the status of various flight parameters, including airspeed, heading, attitude, vertical speed, roll, altitude, and the like.

Abnormal and emergency events are rare occurrences that are typically characterized by time pressure that results in high workload and high stress situations. Pilots are expected to respond to such events quickly and correctly. It is well-known that under high workload and stress, however, pilots are susceptible to reduced situational awareness and increased errors. With limited attention capacity, it is difficult for pilots to integrate information across time and space. This information includes information provided through the MFD, for example. It also includes information from various electronic manuals, electronic checklists, synoptic pages, data communication displays, MFDs, EFBs, and voice communications, which are often required during abnormal situations, such as emergency events. Unfortunately, the information needed to respond (for example, checklists, quick reference handbooks, etc.) are not all displayed on one display, and are not always useful or readily available during abnormal events with a significant time pressure element. Further, even where an abnormal situation is not present, pilots may still encounter high workload and high stress situations, which may lead to reduced situational awareness.

As such, it would be desirable to provide a system and method on an aircraft for diagnosing an abnormal situation and integrating the necessary information to respond to the abnormal situation across multiple resources. It would further be desirable to provide a system and method that provides this integrated information to the pilot as a single display, regardless of the presence of an abnormal situation. Other desirable features and characteristics of the present invention will become apparent from the subsequent detailed description of the invention and the appended claims, taken in conjunction with the accompanying drawings and this background of the invention.

BRIEF SUMMARY

A display system and method for providing a display are disclosed herein. In an exemplary embodiment, a display system includes a computer processor, the computer processor being configured to receive information from a plurality of sensors. The computer processor is further configured to detect an abnormal situation, based on information received from the plurality of data sources. The display system further includes a database including abnormal situation response procedures in operable communication with the processor, wherein the database is configured to provide the processor with the abnormal situation response procedures upon the detection of an abnormal situation. The display system further includes a display device in operable communication with the processor, wherein the display device is configured to display information from the data sources regarding the abnormal situation, the abnormal situation response procedures, and/or other information necessary to manage the abnormal situation. As used herein the term abnormal situation response procedure is intended to refer to any action or decision required as a pilot response, whether or not part of a formal procedure.

In variations of this embodiment, the processor may further be configured to receive information regarding a response to the abnormal situation. The database may further include expected response data. The processor may be further configured to compare the received information regarding the response to the abnormal situation and the expected response data, and dynamically update the abnormal situation response procedures provided to the display device.

In another exemplary embodiment, a method for providing a display includes receiving information from a plurality of sensors, detecting an abnormal situation, based on information received from the plurality of data sources, receiving abnormal situation response procedures upon the detection of an abnormal situation, and displaying information from the data sources and other information systems regarding the abnormal situation and the abnormal situation response procedures. The steps of receiving data source information, detecting an abnormal situation, integrating and summarizing the situation on a display, and receiving abnormal situation response procedures may be performed by a computer processor, and the method may include providing such computer processor.

In variations of this embodiment, the method may further include receiving information regarding a response to the abnormal situation, receiving expected response data, comparing the received information regarding the response to the abnormal situation and the expected response data, and dynamically updating the displayed abnormal situation response procedures.

In further variations, the display may be provided at any time before, during, or after a flight to assist the flight crew in more effectively managing their workload, regardless of the presence of an abnormal situation.

In an exemplary application of the present invention, the display system is a flight display system, and the method for providing a display is a method for providing a flight display.

BRIEF DESCRIPTION OF THE DRAWINGS

At least one example of the present invention will hereinafter be described in conjunction with the following figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
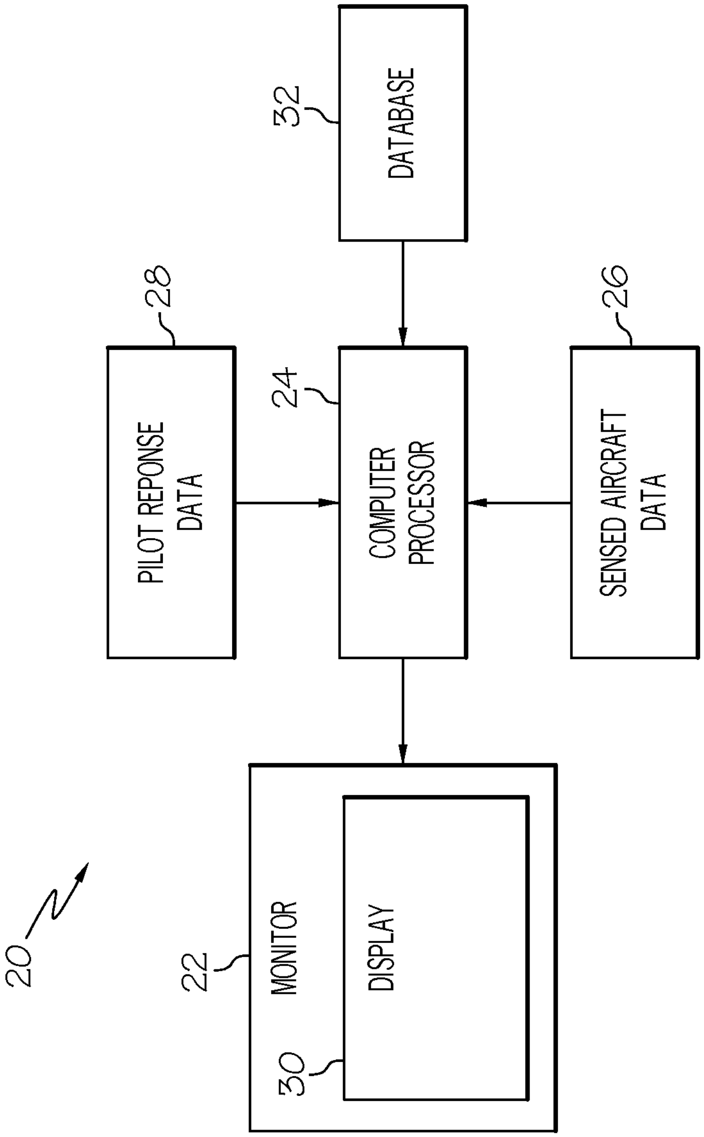
FIG. 1 is a functional block diagram of a generalized display system suitable for generating a flight display in accordance with an exemplary embodiment.

FIG. 1 is a functional block diagram of a generalized flight display system 20. Flight display system 20 includes at least one monitor 22, a computer processor 24, and a plurality of data sources 26 including data from sensors and information systems onboard the aircraft. Sensor data and onboard information can pertain to any sensed or inferred condition on the aircraft, including but not limited to engine data, avionics data, altitude data, hydraulics data, flight controls data, positional data, fuel data, and any other types of aircraft data for which a condition can be sensed or derived. Data sources 26 can also include data communications from the ground, from information processing systems onboard that process raw data, from reference systems and databases such as EFB manuals and navigation databases, among other sources of data.

Flight display system 20 also includes a further data source including pilot response data 28. Pilot response data 28 can include any kind of control input or systems input provided by the pilot to the aircraft. Examples of pilot response data 28 can include, but are not limited to, flight controls responses, engine inputs including engine shut-down procedures, acknowledgement of emergency indicators, flight plan system inputs, radio communications, data communications, and any other types of pilot-controlled inputs or responses.

Monitor 22 can include any suitable image-generating device including various analog devices (e.g., cathode ray tube) and digital devices (e.g., liquid crystal, active matrix, plasma, etc.). Computer processor 24 may include, or be associated with, any suitable number of individual microprocessors, memories, power supplies, storage devices, interface cards, and other standard components known in the art. In this respect, the computer processor 24 may include or cooperate with any number of software programs or instructions designed to carry out the various methods, process tasks, calculations, and control/display functions described below.

During operation of flight display system 20, computer processor 24 drives monitor 22 to produce a visual display 30 thereon. In one group of embodiments, display system 20 may be deployed on the flight deck of an aircraft. In such embodiments, monitor 22 may assume the form of a Multi-Function Display (MFD). Similarly, processor 24 may assume the form of, for example, a Flight Management Computer of the type commonly deployed within a Flight Management System (FMS). Sensed aircraft data sources 26 may, in addition to the data discussed above, include one or more of the following systems: a runaway awareness and advisory system, an instrument landing system, a flight director system, a weather data system, a terrain avoidance and caution system, a traffic and collision avoidance system, a terrain database, an inertial reference system, and a navigational database.

Flight display system 20 also includes a database 32 that can store information related to abnormal aircraft situations, such as emergency situations. In one embodiment, database 32 can include information for responding to an abnormal situation, including, for example, emergency checklists, aircraft system schematics, quick reference handbooks, flight procedures for nearby airports, emergency communications radio frequencies, and the like. However, in other embodiments, database 32 can alternatively or additionally include information for responding to normal flight situation. For example, database 32 can include information for responding to an engine failure. This may include an engine failure checklist for shutting down the failed engine, an approach checklist for making an approach to an airport using a single engine, a listing of nearby airports including communications frequencies therefor, and other information necessary or useful in responding to an engine failure.

In conjunction with the information for responding to abnormal situations, the database 32 can include expected pilot response information for an abnormal situation. Expected pilot response information includes all the actions that a pilot should take, following procedures, in responding to a given emergency situation. As used herein, abnormal situation response procedure is intended to refer to any action or decision required as a pilot response, whether or not part of a formal procedure. Using the same example of an engine failure, expected response information may include idling of the failed engine, shut-down of the failed engine, cutting the fuel supply to the failed engine, flight control adjustments for single engine operations, flight plan changes, communication of situation and intent to Air Traffic Control, and other expected pilot responses for responding to an engine out situation.

Based on the sensed aircraft data 26, the pilot response data 28, and the database 32 of stored information for responding to abnormal situations and of expected pilot response information, computer processor 24 is configured to diagnose an abnormal situation and integrate the necessary information for responding to the abnormal situation across multiple resources, and to display the integrated information to the pilot in a single display, i.e. monitor 22/display 30. The flight display system 20 collects all of the electronic information needed in an abnormal or emergency situation and displays it in one place, the information being of a type that is traditionally distributed to a variety of displays and devices in an aircraft cockpit. It provides decision support aids to help the pilot quickly and correctly respond to the situation. If the information received from the aircraft sensors does not match a known abnormal situation for which there is a stored abnormal situation response procedure, the flight display may still summarize the information from the sensors and other sources of information to provide an overview of the current state of the situation.

In one exemplary embodiment, the flight display system 20 monitors the aircraft caution and alerting system messages for anomalies, failures, and emergency situations. In this manner, the caution and alerting system provides the sensed aircraft data 26 directly to the processor 24. As the caution and alerting system is already standard equipment on many aircraft, this data link through the caution and alerting system avoids the need to have a dedicated electronic connection between the aircraft sensors and the flight display system 20. The flight display system 20, in one embodiment, compares evolving situations as provided by the caution and alerting system to indicator or "signatures" of abnormal events. In other embodiments, the flight display system 20 includes a reasoning system that processes real time data, a pattern matching system, or other database approach to detect an abnormal situation. Thus, when an anomaly, failure, emergency, or other abnormal situation is detected, the flight display system 20 identifies and collects applicable information, reconfigures the display 30, and presents of all the relevant information needed to troubleshoot and correct the condition (for example, synoptic displays, procedural checklist, pilot's manual, quick reference handbook, etc.). As such, the display system 20 abstracts low level data to high level data that supports overall situational awareness for a flight crew during a time-pressure situation For known emergencies and failures where responses are understood and predetermined, the flight display system 20 provides procedural information and automatically walks the crew through the task providing cues and decision support on the display 30. With continued reference to the example of an engine out emergency situation, the flight display system 20 displays the following (non-limiting) information on a single display 30: First, the flight display system 20 is configured to collect all relevant abnormal situation information from database 32 (e.g., including procedures, supporting information, and cues), in one location. Second, engine performance data from sensed aircraft data 26 is added to the display 30. Third, an engine system schematic display from database 32 is also added to the display so pilots can begin to troubleshoot the problem. Additionally, once the situation is corrected (or contained), a flight plan display from database 32 is added to display the nearest airport for an emergency landing and an alternate flight plan is loaded into the FMS. Other reference documents from database 32 are displayed at the request of the pilot. In another embodiment, other necessary or useful data for responding to an engine out situation may be provided via the display 30 in any sequence.

If multiple anomalies, failures, or emergencies are detected, the flight display system prioritizes the procedures based on their criticality. In this manner, the computer processor 24 also includes a filtering function to allow the prioritization of procedures based on the criticality of the abnormal situation. Filtering functions are known in the art and are in place in many aircraft systems, including currently implemented EICAS systems.

In one exemplary embodiment, the flight display system 20 further includes a pilot response function for monitoring the pilot response to the abnormal situation and for updating the display 30 dynamically based on the pilot's ongoing response to the abnormal situation. The database 32 includes expected pilot response information that can be provided in the form of task models. The processor 24 is configured to compare expected pilot behaviors from the task models to what is observed from the pilot response data 28. The pilot response function thus supports a variable level of assistance based on how well the pilot is responding. Thus, flight display system 20 provides minimal guidance to an expert pilot who responds quickly and accurately to the abnormal situation and more extensive task support to novice pilots who might not act decisively and correctly. That is, for example, if pilots are responding quickly and accurately per the task model, very little assistance is provided. However, if the pilots are slow to respond or perform incorrect tasks, the amount of assistance is increased. In this manner, the flight display system 20 can dynamically adjust the information provided via display 30 based on pilot response data 28 received in comparison to the expected pilot response information stored in database 32.

Of course, in other embodiments, the monitoring systems and pilot response functions can alternatively or additionally be configured to monitor and anticipate pilot responses to normal situations to assist the crew in dealing with the normal workload that is typically encountered in flight.

Figure 2:
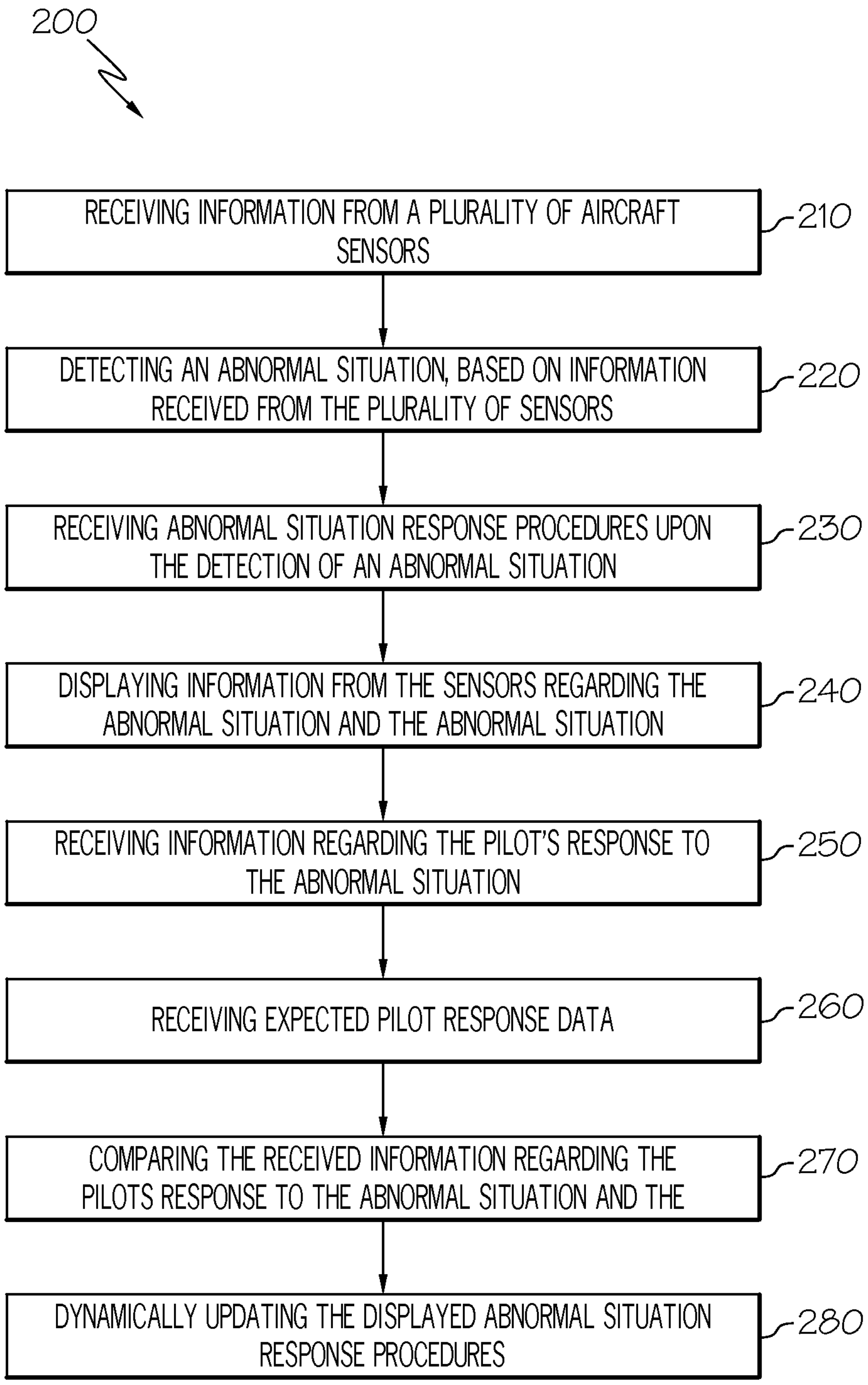
FIG. 2 is a method for providing a flight display in accordance with an exemplary embodiment.

FIG. 2 depicts an exemplary method 200 for providing a flight display in accordance with the present disclosure. At step 210, the method includes receiving information from a plurality of aircraft sensors. At step 220, the method includes detecting an abnormal situation, based on information received from the plurality of sensors. At step 230, the method includes receiving abnormal situation response procedures upon the detection of an abnormal situation. If the information received from the aircraft sensors does not match a known abnormal situation for which there is a stored abnormal situation response procedure, the flight display may still summarize the information from the sensors and other sources of information to provide an overview of the current state of the situation. Further, at step 240, the method includes displaying information from the sensors regarding the abnormal situation and the abnormal situation response procedures. In some embodiments, the steps of receiving sensor information, detecting an abnormal situation, and receiving abnormal situation response procedures may be performed by a computer processor, for example processor 24 as shown in FIG. 1, and the method may include providing such computer processor.

Figure 3:
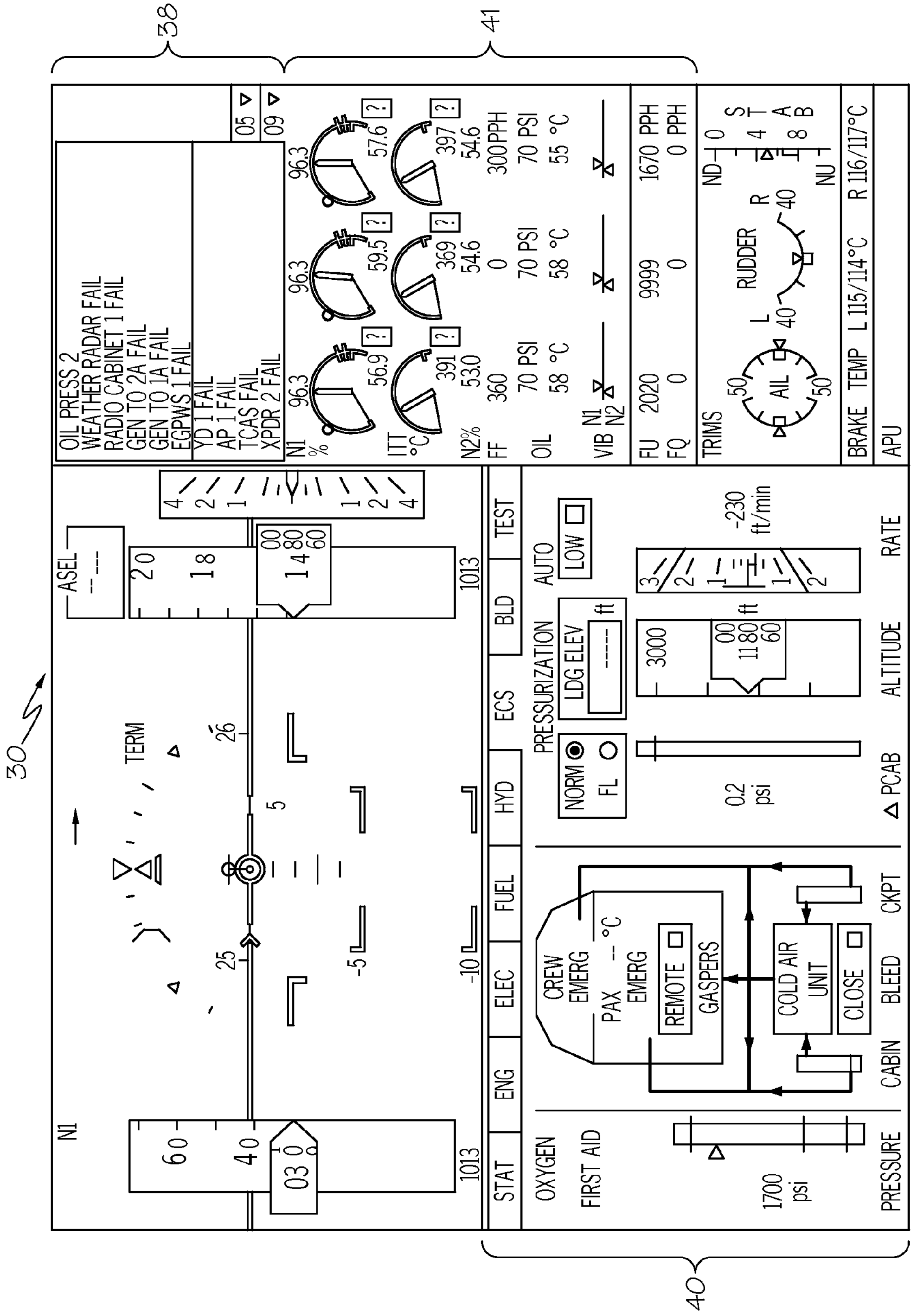
FIG. 3 is an exemplary flight display in accordance with an embodiment.

In some embodiments, at step 250, the method includes receiving information regarding the pilot's response to the abnormal situation. At step 260, the method includes receiving expected pilot response data. Further, at step 270, the method includes comparing the received information regarding the pilot's response to the abnormal situation and the expected pilot response data. Additionally, at step 280, the method includes dynamically updating the displayed abnormal situation response procedures based on the comparison between received information regarding the pilot's response to the abnormal situation and the expected pilot response data FIG. 3 depicts an exemplary flight display 30 in accordance with an embodiment. Display 30 may be an MFD, it may be a display associated with an EICAS system, or it may be any other flight display as noted above. As depicted in FIG. 3, display 30 is presenting a plurality of warnings 38 regarding abnormal situations. These include engine oil pressure, weather radar failure, and radio cabinet 1 failure, among others as explicitly depicted. Also included on the display are other flight parameters in a non-abstracted form, including engine information 39 and air pressure information 40, among other parameters.

Figure 4:
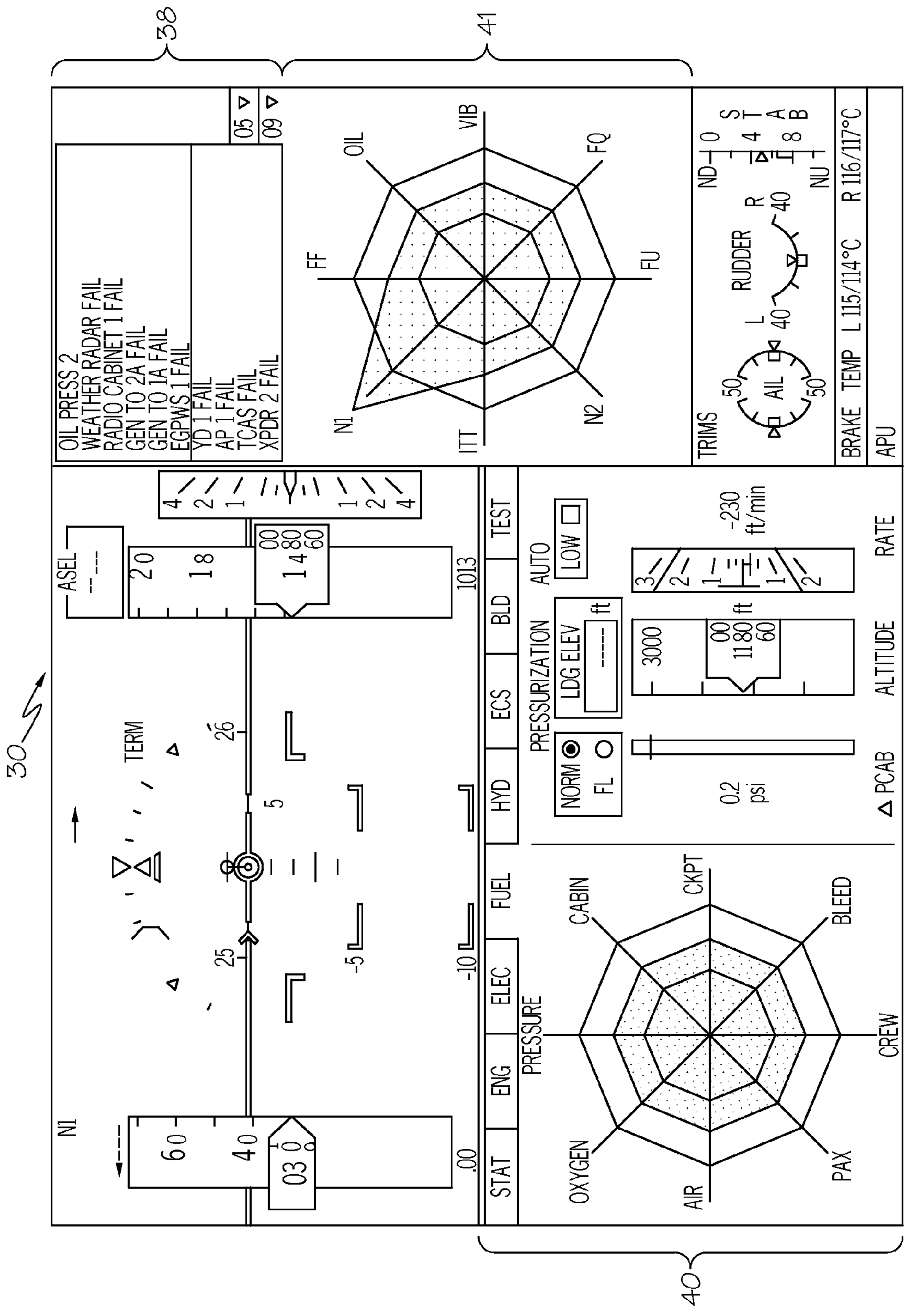
FIG. 4 is another exemplary flight display in accordance with an embodiment.

Once an abnormal situation is detected, as is clearly indicated by the warning display 38, the display 30 is reconfigured to begin presenting information to the pilot to assist in responding to the abnormal situation. With reference now to FIG. 4, engine information 39 has been replaced with an abstracted engine display 41, and air pressure information 40 has been replaced with an abstracted air pressure display 42. The abstracted displays are provided to allow the pilot to quickly and easily gain the necessary information for responding to the abnormal situation, which is especially important during high-workload situations such as responding to emergency or other abnormal situations.

Accordingly, it will be appreciated that embodiments of the present disclosure present a top-level "situation" of aircraft health, operational status, etc., and consolidate and prioritize information necessary for the pilot to respond to abnormal conditions. The disclosed flight display system adapts the flow and content of the information based on the suitability and timeliness of the pilot's responses. As such, the flight display system includes dynamic, adaptive capabilities to display information for responding to an abnormal situation based on how well the pilot is reacting to the situation. Thereby, dynamically updating the abnormal situation response procedures can include providing differing levels of detail regarding the abnormal situation response procedures to pilots of differing levels of experience or proficiency. Further, it will be appreciated that while the "abnormal situation" is presented as an embodiment, in other embodiments, the display system described herein can be adapted to assist the flight crew in flying the aircraft under normal situations, which will be of benefit to flight crews especially during high workload times such as, for example, during takeoff, departure, approach, and landing procedures.

While the present disclosure has provided exemplary embodiments directed to a flight display system, it will be appreciated that the embodiments presented herein can be extended to other applications where abnormal situations may occur, and where responses to abnormal situations may be improved through the use of a display. For example, other suitable applications may include maritime applications, railroad applications, industrial/manufacturing plant applications, space travel applications, simulator applications, and others as will be appreciated by those having ordinary skill in the art.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A display system, comprising:

a computer processor, the computer processor being configured to receive information from a plurality of sensors and information systems, and further configured to detect an aircraft situation, based on information received from the plurality of sensors and information systems;

a database including abnormal situation response procedures in operable communication with the processor, wherein the database is configured to provide the processor with the aircraft situation response procedures upon the detection of an aircraft situation; and a display device in operable communication with the processor, wherein the display device is configured to display information from the sensors and information systems regarding the aircraft situation and the aircraft situation response procedures, thereby collecting electronic information needed in an aircraft situation and displaying such electronic information in a single place, wherein the processor is further configured to receive information regarding a response to the aircraft situation, wherein the database further comprises expected response data, wherein the processor is further configured to compare the received information regarding the response to the aircraft situation and the expected response data, wherein the processor is further configured to dynamically update the aircraft situation response procedures provided to the display device according to the following:

if the information regarding the response to the aircraft situation corresponds with the expected response data as a result of the comparing, the processor is further configured to display less information regarding the aircraft situation and the aircraft situation response procedures; and if the information regarding the response to the aircraft situation does not correspond with the expected response data as a result of the comparing, the processor is further configured to display more information regarding the aircraft situation and the aircraft situation response procedures, and wherein the processor is further configured to dynamically update the aircraft situation response procedures by providing a relatively greater level of detail regarding the aircraft situation response procedures to pilots, based on the received information regarding the response to the aircraft situation, determined to be relatively inexperienced pilots, and by providing a relatively lesser level of detail regarding the aircraft situation response procedures to pilots, based on the received information regarding the response to the aircraft situation, determined to be relatively experienced pilots, thereby providing differing levels of detail regarding the aircraft situation response procedures to pilots of differing levels of experience or proficiency.

2. The display system of claim 1, wherein the display system is a flight display system.

3. The display system of claim 2, wherein the plurality of sensors are a plurality of aircraft sensors.

4. The display system of claim 3, wherein the aircraft situation is an abnormal situation and wherein at least one of the plurality of sensors is an engine condition sensor.

5. A computer-implemented method for generating a display, comprising:

receiving information from one or more of data sources, databases, communication systems and onboard information systems, the information being of a type that is traditionally distributed to a variety of displays and devices in an aircraft cockpit;

detecting an abnormal situation, based on information received from the plurality of data sources;

receiving abnormal situation response procedures upon the detection of an abnormal situation;

receiving information regarding a response to the abnormal situation;

receiving expected response data;

comparing the received information regarding the response to the abnormal situation and the expected pilot response data;

dynamically updating the displayed abnormal situation response procedures according to the following:

if the information regarding the response to the abnormal situation corresponds with the expected response data as a result of the comparing, the processor is further configured to display less information regarding the abnormal situation and the abnormal situation response procedures; and if the information regarding the response to the abnormal situation does not correspond with the expected response data as a result of the comparing, the processor is further configured to display more information regarding the abnormal situation and the abnormal situation response procedures; and displaying information from the sensors regarding the abnormal situation and the abnormal situation response procedures, wherein the steps of receiving data source information, detecting an abnormal situation, and receiving abnormal situation response procedures are performed by a computer processor, and wherein the step of dynamically updating the abnormal situation response procedures comprises providing a relatively greater level of detail regarding the abnormal situation response procedures to pilots, based on the received information regarding the response to the abnormal situation, determined to be relatively inexperienced pilots, and by providing a relatively lesser level of detail regarding the abnormal situation response procedures to pilots, based on the received information regarding the response to the abnormal situation, determined to be relatively experienced pilots, thereby providing differing levels of detail regarding the abnormal situation response procedures to pilots of differing levels of experience or proficiency.

6. The computer-implemented method of claim 5, wherein generating a display comprises generating a flight display.

7. The computer-implemented method of claim 6, wherein receiving information from the plurality of data sources comprises receiving information from a plurality of aircraft sensors.

8. The computer-implemented method of claim 7, wherein receiving information from the plurality of aircraft data sources comprises receiving information from at least one engine sensor.

9. A flight display system, comprising:

a computer processor, the computer processor being configured to receive information from a plurality of aircraft data sources, and further configured to detect an abnormal situation, based on information received from the plurality of aircraft data sources;

a reasoning system that processes real time data in operable communication with the processor, wherein the reasoning system is configured to provide the processor with the abnormal situation response procedures upon the detection of an abnormal situation; and a display device in operable communication with the processor, wherein the display device is configured to display information from the sensors regarding the abnormal situation and the abnormal situation response procedures, wherein the processor is further configured to receive information regarding a response to the abnormal situation, wherein the reasoning system further comprises expected response data, wherein the processor is further configured to compare the received information regarding the response to the abnormal situation and the expected response data, and wherein the processor is further configured to dynamically update the abnormal situation response procedures provided to the display device according to the following:

if the information regarding the response to the abnormal situation corresponds with the expected response data as a result of the comparing, the processor is further configured to display less information regarding the abnormal situation and the abnormal situation response procedures; and if the information regarding the response to the abnormal situation does not correspond with the expected response data as a result of the comparing, the processor is further configured to display more information regarding the abnormal situation and the abnormal situation response procedures, and wherein the processor is further configured to dynamically update the abnormal situation response procedures by providing a relatively greater level of detail regarding the abnormal situation response procedures to pilots, based on the received information regarding the response to the abnormal situation, determined to be relatively inexperienced pilots, and by providing a relatively lesser level of detail regarding the abnormal situation response procedures to pilots, based on the received information regarding the response to the abnormal situation, determined to be relatively experienced pilots, thereby providing differing levels of detail regarding the abnormal situation response procedures to pilots of differing levels of experience or proficiency.

10. The flight display system of claim 9, wherein the display device is configured to display information relevant to an abnormal situation on a single display, the information being of a type that is traditionally distributed to a variety of displays and devices in an aircraft cockpit.

* * * * *